United States Patent
Samavedula

(10) Patent No.: US 8,806,323 B2
(45) Date of Patent: Aug. 12, 2014

(54) SYSTEMS AND METHODS FOR MULTIPLE COLUMN SORTING AND LOCKING

(75) Inventor: Ravi Kiran Samavedula, Bangalore (IN)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 13/244,236

(22) Filed: Sep. 23, 2011

(65) Prior Publication Data
US 2013/0031452 A1 Jan. 31, 2013

(51) Int. Cl.
*G06F 17/22* (2006.01)
*G06F 17/30* (2006.01)

(52) U.S. Cl.
USPC .......... 715/227; 715/256; 715/762; 707/752; 707/999.007

(58) Field of Classification Search
USPC ......... 715/200, 204, 205, 226, 227, 229, 231, 715/234, 255, 256, 273, 700, 760, 762
See application file for complete search history.

(56) References Cited

U.S. PATENT DOCUMENTS

| | | | | |
|---|---|---|---|---|
| 6,004,276 A * | 12/1999 | Wright et al. | ................. | 600/508 |
| 6,304,873 B1 * | 10/2001 | Klein et al. | ........................... | 1/1 |
| 6,353,828 B1 * | 3/2002 | Ganesh et al. | ....................... | 1/1 |
| 6,484,172 B1 * | 11/2002 | Lee et al. | ............... | 1/1 |
| 6,606,626 B1 * | 8/2003 | Ponnekanti | ........................... | 1/1 |
| 6,658,413 B1 * | 12/2003 | Reddy et al. | .......................... | 1/1 |
| 6,658,513 B1 * | 12/2003 | Boonie et al. | ................ | 710/200 |
| 6,772,155 B1 * | 8/2004 | Stegelmann | ........................... | 1/1 |
| 7,231,596 B2 * | 6/2007 | Koren | .......................... | 715/210 |
| 7,236,974 B2 * | 6/2007 | Bhattacharjee et al. | .............. | 1/1 |
| 8,407,531 B2 * | 3/2013 | Tran et al. | ....................... | 714/57 |
| 2002/0194095 A1 * | 12/2002 | Koren | ............................ | 705/35 |
| 2004/0061702 A1 * | 4/2004 | Kincaid | ........................ | 345/440 |
| 2004/0205066 A1 * | 10/2004 | Bhattacharjee et al. | .......... | 707/8 |
| 2006/0167845 A1 * | 7/2006 | Xia et al. | .......................... | 707/3 |
| 2009/0276430 A1 * | 11/2009 | Bruso et al. | ....................... | 707/8 |
| 2011/0214024 A1 * | 9/2011 | Tran et al. | ....................... | 714/57 |

OTHER PUBLICATIONS

Mohan et al. "Algorithms for Creating Indexes for Very Large Tables Without Quiescing Updates", ACM, 1992, pp. 361-370.*

* cited by examiner

*Primary Examiner* — Maikhanh Nguyen
(74) *Attorney, Agent, or Firm* — Hanley, Flight and Zimmerman, LLC

(57) ABSTRACT

Certain examples provide a computer-implemented method. The method includes displaying, at an initial position, a first entry of a plurality of entries of a table. The method includes displaying a first indicator to indicate that the first entry has been assigned from a set of unlocked entries to a set of locked entries, and that the first entry is assigned to a first lock position. The method includes sorting the plurality of entries to determine a first sort order including a first sort position of the first entry that is different from the first lock position. The method includes displaying the set of unlocked entries according to the first sort order and displaying the first entry at the first lock position.

20 Claims, 8 Drawing Sheets

| Lock | Name | Age | Weight | Height |
|---|---|---|---|---|
| 🔒 | Ravi | 27 | 59 | 5 |
|  | Tom | 28 | 64 | 8 |
|  | Adam | 29 | 62 | 10 |
|  | Joe | 31 | 65 | 4 |
|  | Raju | 33 | 60 | 6 |
|  | Manoj | 40 | 53 | 7 |
|  | Mike | 42 | 44 | 9 |

FIG. 3

| Lock | Name | Age | Weight | Height |
|------|------|-----|--------|--------|
| 🔒 | Ravi | 27 | 59 | 5 |
| 🔒 | Mike | 42 | 44 | 9 |
|  | Manoj | 40 | 53 | 7 |
|  | Raju | 33 | 60 | 6 |
|  | Adam | 29 | 62 | 10 |
|  | Tom | 28 | 64 | 8 |
|  | Joe | 31 | 65 | 4 |

FIG. 4

| Lock | Name | Age | Weight | Height |
|------|------|-----|--------|--------|
|  🔒  | Ravi | 27  | 59     | 5      |
|  🔒  | Mike | 42  | 44     | 9      |
|      | Joe  | 31  | 65     | 4      |
|      | Raju | 33  | 60     | 6      |
|      | Manoj| 40  | 53     | 7      |
|      | Tom  | 28  | 64     | 8      |
|      | Adam | 29  | 62     | 10     |

FIG. 5

SYSTEMS AND METHODS FOR MULTIPLE COLUMN SORTING AND LOCKING

RELATED APPLICATIONS

This application claims the benefit of priority of Indian Patent Application No. 1059/CHE/2011, filed on Jul. 28, 2011, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND

Hospitals and clinicians today are facing pressure to deliver high quality patient care, prevent adverse events/errors, and implement clinical best practices while reducing the cost of healthcare delivery. With an increase in electronic systems and electronic clinical data, clinicians are being asked to review large amounts of clinical data. It is currently unfeasible to review and process such data by a clinician.

BRIEF SUMMARY

Certain examples provide systems and methods for sorting and locking data entries in a table.

Certain examples provide a computer-implemented method. The method includes displaying, at an initial position, a first entry of a plurality of entries of a table. The method includes displaying a first indicator to indicate that the first entry has been assigned from a set of unlocked entries to a set of locked entries, and that the first entry is assigned to a first lock position. The method includes sorting the plurality of entries to determine a first sort order including a first sort position of the first entry that is different from the first lock position. The method includes displaying the set of unlocked entries according to the first sort order and displaying the first entry at the first lock position.

In certain examples, the method can be stored on a computer-readable storage medium for implementation by a processor.

Certain examples provide a clinical information system including a memory storing instructions and data and a processor to execute the instructions. The processor is to execute the instructions to: display, at an initial position, a first entry of a plurality of entries of a table; display a first indicator to indicate that the first entry has been assigned from a set of unlocked entries to a set of locked entries, and that the first entry is assigned to a first lock position; sort the plurality of entries to determine a first sort order including a first sort position of the first entry that is different from the first lock position; and display the set of unlocked entries according to the first sort order and displaying the first entry at the first lock position.

BRIEF DESCRIPTION OF SEVERAL VIEWS OF THE DRAWINGS

FIGS. 2-5 illustrate example tables of sorted and/or unsorted clinical data.

Figure 1A:
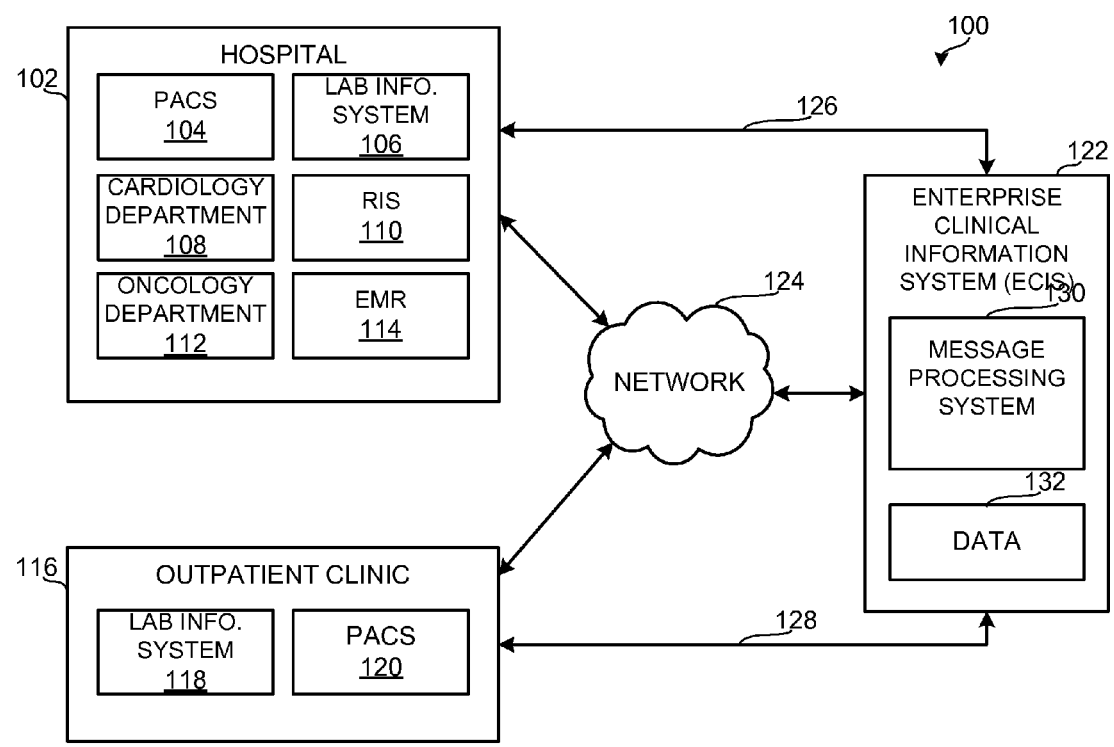
FIG. 1A is a block diagram of an example healthcare environment in which the example methods, apparatus, systems and/or articles of manufacture described herein to organize healthcare information may be implemented.

The foregoing summary, as well as the following detailed description of certain examples of the present invention, will be better understood when read in conjunction with the appended drawings. For the purpose of illustrating the invention, certain examples are shown in the drawings. It should be understood, however, that the present invention is not limited to the arrangements and instrumentality shown in the attached drawings.

DETAILED DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

Certain examples facilitate review, manipulation, and analysis of large data sets organized in a row and column format (e.g., spreadsheet). Certain examples allow a user to hold, lock, or "pin" certain row(s), column(s), and/or cell(s) and resort remaining entries to facilitate improved reviewing, analysis, and manipulation of the data, such as patient-related data.

FIG. 1A is a block diagram of an example healthcare environment 100 in which the example methods, apparatus, systems and/or articles of manufacture described herein to organize healthcare information may be implemented. The example healthcare environment 100 includes a hospital 102 having a plurality of entities operating within and/or in association with the hospital 102. The hospital 102 includes a picturing archiving and communication system (PACS) 104, a laboratory information system 106, a cardiology department 108, a radiology information system (RIS) 110 and an oncology department 112. However, the hospital 102 may include more, less and/or different entities than depicted such as including a Healthcare Information System (HIS).

The cardiology department 108 includes cardiology-related healthcare practitioners, staff and devices and/or systems that support cardiology practices and treatments. The cardiology department 108 may have specific formats and/or structures in which healthcare documentation is generated, received, transmitted and/or processed. The oncology department 112 includes cancer-related healthcare practitioners, staff and devices and/or systems that support oncology practices and treatments. The oncology department 112 may have specific formats and/or structures in which healthcare documentation is generated, received, transmitted and/or processed that differ from the formats and/or structures used in connection with the cardiology department 108. In some examples, an Admit Discharge Transfer (ADT) message generated by the cardiology department 108 may be in a first format while a similar ADT message generated by the oncology department 112 may be in a second format. In some examples, an Observation Results Message (ORU) message generated by the cardiology department 108 may be a first format while a similar ORU message generated by the oncology department 112 may be in a second format. Such differences may also exist between any of the PACS 104, the laboratory information system 106, the RIS 110, etc.

The PACS 104 stores medical images (e.g., x-rays, scans, three-dimensional renderings, etc.) such as, for example, digital images in a database or registry. Images are stored in the PACS 104 by healthcare practitioners (e.g., imaging technicians, physicians, radiologists) after a medical imaging of a patient. Additionally or alternatively, images may be automatically transmitted from medical imaging devices to the PACS 104 for storage.

The RIS 110 stores data related to radiology practices such as, for example, radiology reports, messages, warnings, alerts, patient scheduling information, patient demographic data, patient tracking information, and/or physician and patient status monitors. Additionally the RIC 110 enables exam order entry (e.g., ordering an x-ray of a patient) and image and film tracking (e.g., tracking identities of one or more people that have checked out a film).

The laboratory information system 106 stores clinical information such as lab results, test scheduling information, corresponding practitioner(s), and/or other information related to the operation(s) of one or more labs at the corresponding healthcare facility. While example types of information are described above as being stored in certain elements of the hospital 102, different types of healthcare data may be stored in one or more of the entities 104-112. Further, the information stored in entities 104-112 may overlap and/or be combined into one or more of the entities 104-112. In some examples, the entities 104-112 of FIG. 1 may interact with an electronic medical record (EMR) system 114. The EMR 114 stores electronic copies of healthcare records associated with, for example, the hospital 102 and the entities 104-112 thereof.

The example healthcare environment 100 also includes an outpatient clinic 116. While two healthcare enterprises (e.g., the hospital 102, the outpatient clinic 116) are depicted in the healthcare environment of FIG. 1, the healthcare environment 100 may include any number (1, 2, 3, etc.) of similar or different healthcare enterprises. The example outpatient clinic 116 includes a lab information system 118 and a PACS 120 that operate similarly to the corresponding entities of the example hospital 102. The lab information system 118 and the PACS 120 of the example outpatient clinic 116 may generate, receive, transmit and/or process healthcare documentation differently than the hospital 102. Thus, differences in the formatting and/or structuring of healthcare information may exist between entities of a healthcare enterprise and/or between healthcare enterprises in general.

The hospital 102 and the outpatient clinic 116 are in communication with an Enterprise Clinical Information System (ECIS) 122 via a network 124. The network 124 may be implemented by, for example, a wireless or wired Wide Area Network (WAN) such as a private network or the Internet, an intranet, a virtual private network, a wired or wireless Local Area Network, etc. More generally, any of the coupling(s) described herein may be via a network. Additionally or alternatively, the hospital 102 and/or the outpatient clinic 116 may be in communication with the ECIS 122 via direct or dedicated transmission mediums 126 and 128.

The ECIS 122 may support healthcare information processing implemented by systems, devices, application, etc., of the healthcare enterprises (e.g., the hospital 102, the outpatient clinic 116, etc.). The ECIS 122 is capable of processing messages, content, segments, etc., via a message processing system 130, generated in connection with different healthcare enterprise entities (e.g., the entities 104-114, 118, 120) even if the messages, content, segments, etc., include different formats, structures, terminology, protocols, policies, etc. The ECIS 122 may also store data 132 associated with the messages, content, segments, etc.

Figure 1B:
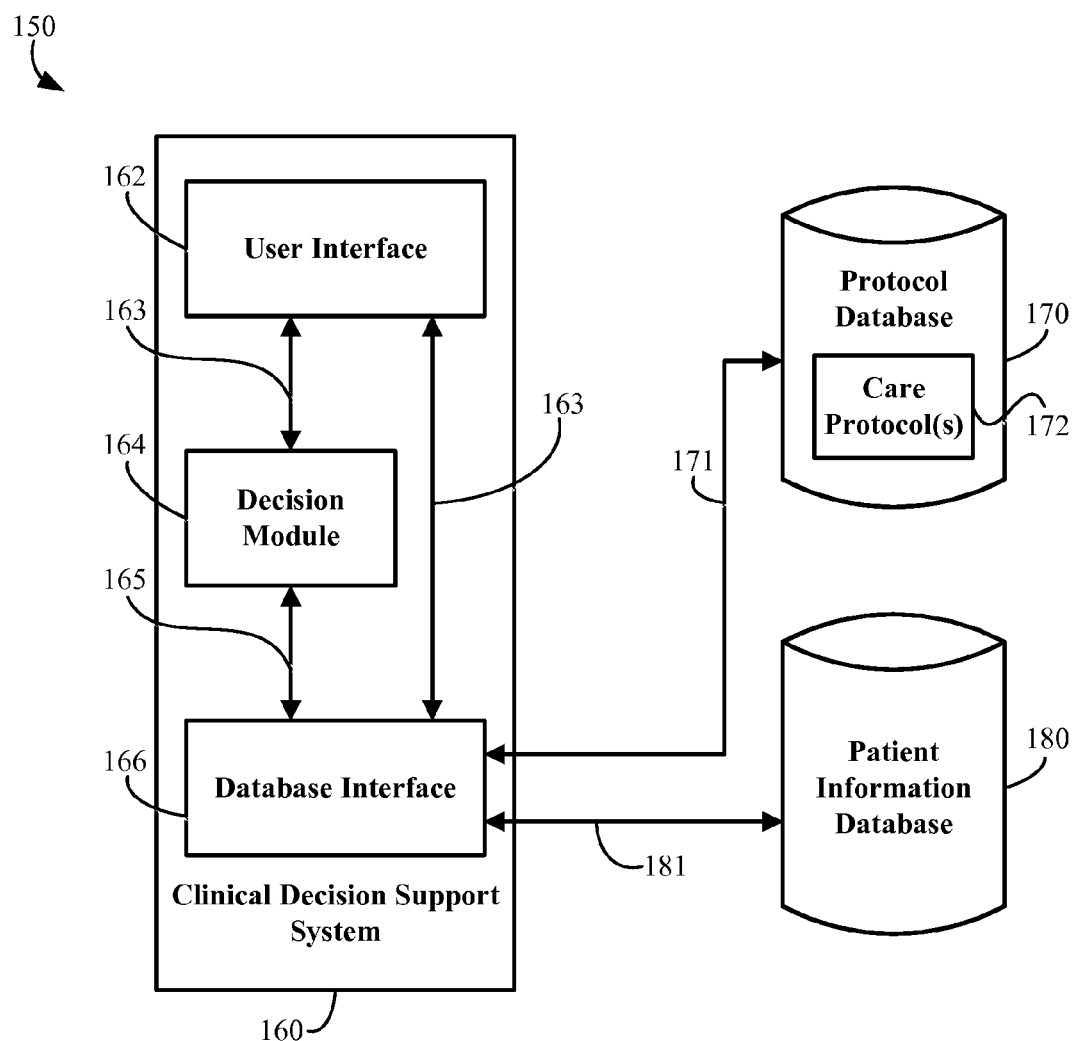
FIG. 1B shows an example processor-implemented clinical environment.

FIG. 1B shows an example processor-implemented clinical environment 150. The environment 150 includes a clinical decision support system 160, a protocol database 170, and a patient information database 180. The clinical decision support system 160 includes a user interface 162, a decision module 164, and a database interface 166. The user interface 162 is logically connected to the decision module 164 and to the database interface 166, as indicated by arrows 163. The decision module 164 is logically connected to the database interface 166, as indicated by arrow 165.

The protocol database 170 stores one or more care protocols 172. A care protocol is generally a detailed guideline for how to manage (e.g., identify and/or treat) a clinical problem, and/or a patient condition. The one or more care protocols 172 generally includes a plurality of rules. The format of the one or more care protocols 172 can vary from plain text to an algorithmic sequence of decisions.

The patient information database 180 stores patient-specific attributes. The patient-specific attribute includes at least one attribute specific to a patient. Suitable patient attributes include, but are not limited to, blood pressure, body temperature, and/or heart rate. The patient information database 180 can store various other patient attributes.

In an example, the one or more care protocols 172 are created by responsible care giver(s) based on statistical data derived from a population of patients that does not include the specific patient. The population of patients may include patients whose clinical problem corresponds to the specific patient's clinical problem, or the population may include patients having various clinical problems. Statistical data and one or more rules can be used to generate a care protocol, for example.

The database interface 166 of the clinical decision support system 160 is configured to receive information from, and send information to, the protocol database 170, as indicated by arrow 171. For instance, the database interface 166 can receive one or more of the care protocols 172 from, or send one or more care protocols to, the protocol database 170. The database interface 166 is further configured to receive information from, and send information to, the patient information database 180, as indicated by arrow 181. For instance, the database interface 166 can receive patient information from, and/or send patient information to, the patient information database 180.

Data from a clinical database, such as the patient information database 180, can be organized in a variety of ways for ease of usage, retrieval, manipulation, storage, transmission, etc. Data can be organized in a structured spreadsheet (e.g., a plurality of entries arranged in a grid of columns and rows), for example. Often, a volume of data involved can be quite large and unwieldy for user review, searching, sorting, and/or manipulation, for example.

Column sorting can be used to sort the elements of column either in ascending or descending order. If a table has more than one column, the table can be sorted one column at a time. If column A is sorted, all the elements of column A can be in ascending or descending order. If column B is sorted, all the elements of column B will be in ascending or descending order, but, at the same time, all the elements of column A are rearranged with according to column B.

Multiple column sorting and locking of a table of data provides an ability to lock rows at their respected positions. In certain examples, one or more rows can be locked, and the full table can be sorted. For example, if a user is interested in the top three elements of column A and column B of a table, the user must sort both column A and column B. If both columns are sorted, then at least one column cannot be sorted. Instead, when column A sorts, then desired rows (e.g., row 1, 2, and/or any other row) can be locked, and, now, column B can be sorted except for the locked rows. Except for the locked rows, all other rows are shown in the sorted format.

In certain examples, a number can be provided in conjunction with the locked row(s) to indicate that locked row's sort order in the respective column. Thus, all columns can be sorted. One or more rows can be locked to be kept from the sorting. Locked row(s) can be unlocked to again participate in the sorting. If there are multiple rows locked, all can be unlocked at one time.

Thus, certain examples allow sorting of multiple columns together by providing locking functionality for the rows in the set of data entries. A user can sort one or more columns In certain examples, an extra column is provided which gives an option to lock, affix, or "pin" the desired row. A user can use these locks to lock rows after and/or before sorting. Locking a row holds the position of the row in same place until the lock is released. Rows can be locked and unlocked at any time. Multiple locks can be applied at the same time on different rows.

After sorting, a user can lock the rows that he or she wants to see. In certain examples, locked (rows) move to the top of the table when a sort is triggered, either in ascending or descending order. In certain examples, rows that are locked can also participate in sorting of other columns, but remain in locked position. Sorting of another column can change positions of rows except for rows that are locked, for example. In certain examples, for locked rows, a sorted position number is displayed at the row and column (e.g., sorted column) intersection point on the corresponding cell(s). These numbers indicate a current sort position of the cell in the column. In certain examples, multiple columns can be sorted at once. If a row is unlocked, it can shift it position according to sorting of a column, for example.

In certain examples, when sort happens on a column, it sorts every cell normally, and then, while displaying, it searches for any locked rows. Thus, while displaying, locked rows hold to their positions and the remainder of the rows are moved according to the sort. Since locked rows remain in their respected positions, their current sort number is displayed with respect to the entry or cell (e.g., on the top of the cell), for example.

In certain examples, when a row is locked, an option is provided to select a column. If the column is selected, then a row and column intersection point is highlighted (e.g., with a color and/or pattern). The highlighting or emphasis (e.g., color, pattern, etc.) is the same for all cells of one column, if locked, for example. An option of sorted number on the cell can also be provided for all the cells. Multiple column sorting can be facilitated where a row is collection of columns, for example.

Thus, a large data set with multiple columns can be easily sorted and viewed at once. When multiple columns are sorted together, certain examples make it easier to find a smallest value, largest value, etc., from one or more different columns. Locking and sorting can be automated as well as user assisted by the system, for example.

Figure 2:
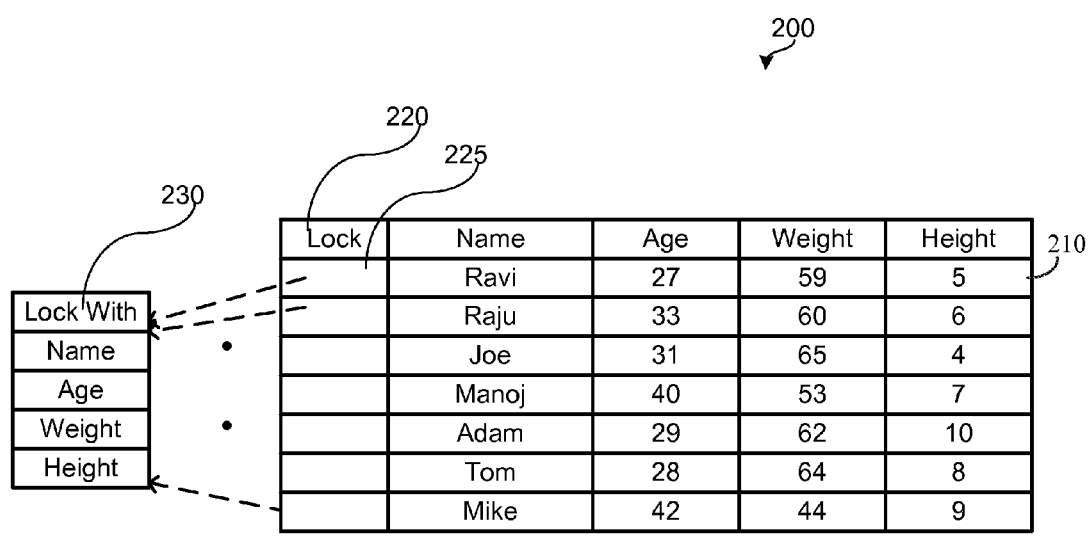

FIG. 2 depicts an example table 200 including unsorted data. A user can lock a selected row 210 of the table by, for example, selecting (e.g., right clicking on) a row's entry 225 in a lock column 220. Using one or more criteria 230, a row 210 can be locked and/or data can be sorted based on the selected criterion(-ia) 230.

Figure 3:
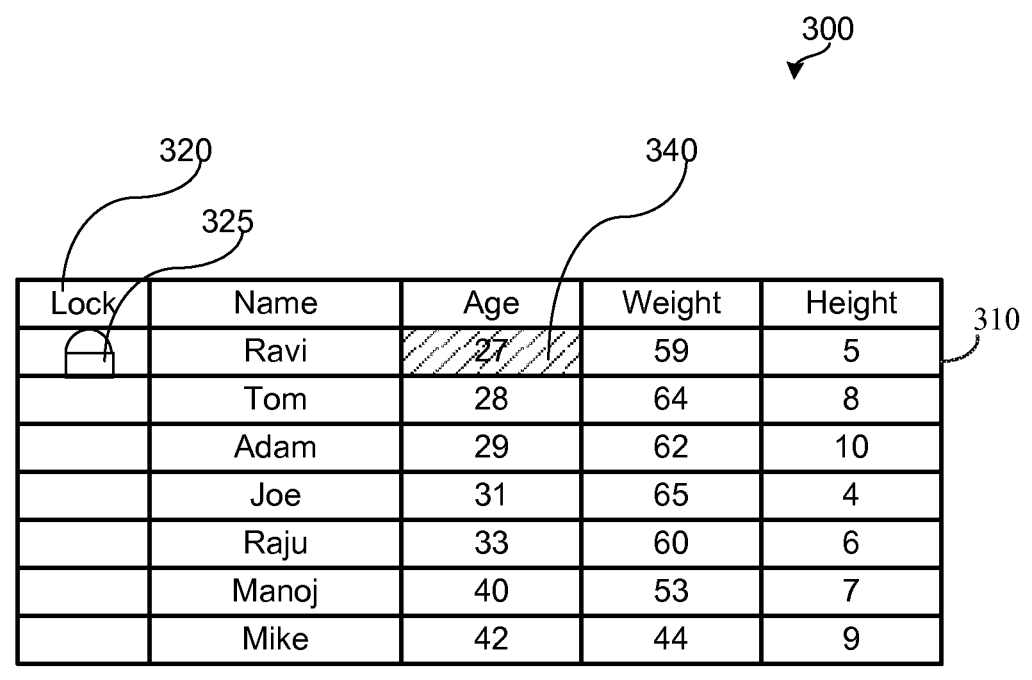

FIG. 3 depicts an example table 300 including data sorted by age. For example, data from the table 200 of FIG. 2 can be sorted according to a selected category or criterion (e.g., name, age, weight, height, etc.). A user can lock a selected row 310 of the table 300 by, for example, selecting (e.g., right clicking on) a row's entry 325 in a lock column 320. When the user locks the first row 310 with column age, the intersection entry 340 is shown in a different color and/or other representation (e.g., pattern, etc.).

FIG. 4 depicts an example table 400 including data sorted by weight. For example, similar to the illustration of FIG. 3, a first row 410 is locked 425, and the data from the table 400 is resorted based on age. As shown in FIG. 4, a second row 415 is locked 427, and data in the table 400 is resorted based on weight, with both the first row 410 and the second row 415 locked 420 and shifted to the top of the table 400 before, during, or after resorting. The row 410, 415 which is locked does not move its position when the table 400 is resorted, for example. An indicator 450 in the weight column indicates that, based on sorted weight in the table 400, the locked entry 410 is third in a comparative list of weights in the table 400. At the same time, the lowest age 440 is provided in the first row 410, and the lowest weight 445 is provided in the second row 415 for the data in the table 400.

Figure 5:
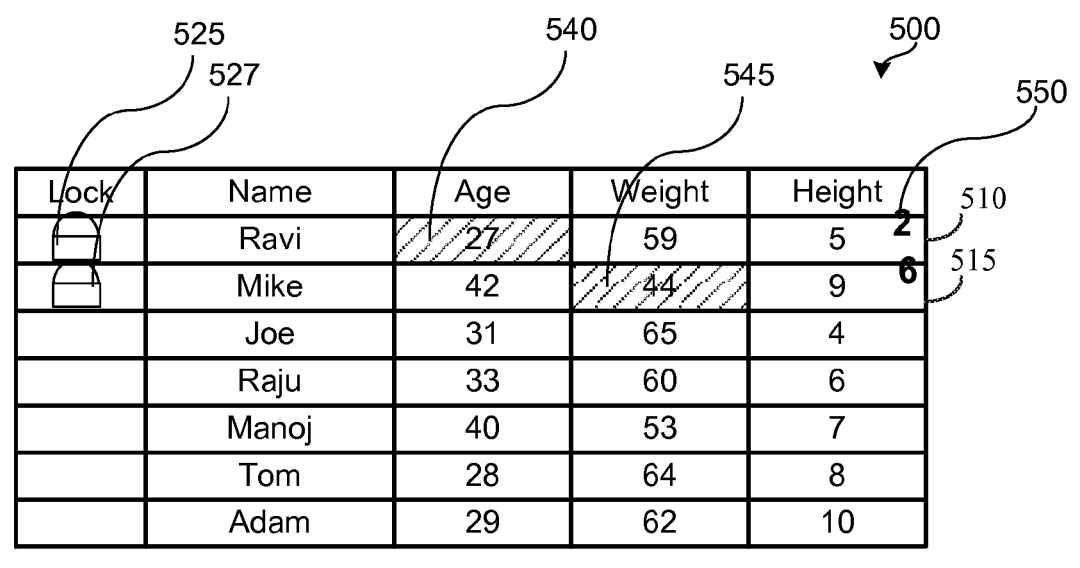

FIG. 5 depicts an example table 500 including data sorted by height. For example, a first row 510 is locked 525, and the data from the table 500 is re-sorted based on age. A second row 515 is locked 527, and data in the table 500 is re-sorted based on weight, with both the first row 510 and the second row 515 locked and shifted to the top of the table 500 before, during, or after resorting. The row 510, 515 which is locked does not move its position when the table 500 is resorted, for example. The indicators 550, 555 in the height column indicate that, based on sorted height in the table 500, the locked entry 510 is second in a comparative list of heights in the table 500, and the locked entry 515 is sixth. Now, as depicted in the example table 500 of FIG. 5, two rows are locked with lowest age 540 and lowest weight 545, and the entries are sorted based on the height column. The third row 517 which is right below the locked second row 515 has the smallest height in the table 500.

Figure 6:
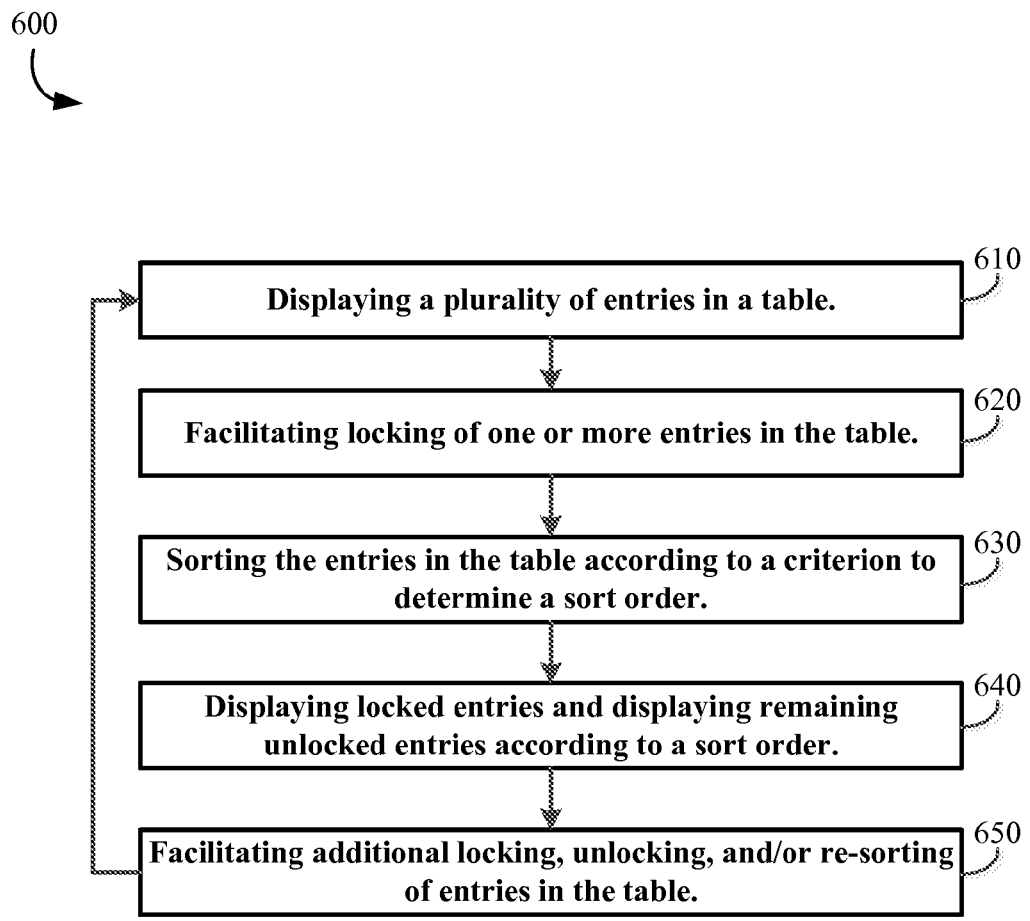
FIG. 6 is a flow diagram that shows an example method to sort and review clinical data.

FIG. 6 is a flow diagram representative of example machine readable instructions that can be executed to implement the example systems shown in FIGS. 1-5 and/or portions of one or more of those systems. The example process (es) of FIG. 6 can be performed using a processor, a controller and/or any other suitable processing device. For example, the example process(es) of FIG. 6 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process(es) of FIG. 6 can be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process(es) of FIG. 6 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process(es) of FIG. 6 can be implemented manually or as any combination(s) of any of the foregoing techniques, for example, any combination of firmware, software, discrete logic and/or hardware. Further, although the example process(es) of FIG. 6 is described with reference to the flow diagram of FIG. 6, other methods of implementing the process(es) of FIG. 6 can be employed. For example, the order of execution of the blocks can be changed, and/or some of the blocks described can be changed, eliminated, sub-divided, or combined. Additionally, any or all of the example process(es) of FIG. 6 can be performed sequentially and/or in parallel by, for example, separate processing threads, processors, devices, discrete logic, circuits, etc.

FIG. 6 is a flow diagram 600 that shows an example method to sort and review clinical data. The method will be explained with reference to the column locking and sorting and associated systems depicted in FIGS. 1-5. However, the method is not limited to the example systems 100, 150.

At block 610, a plurality of entries of data are displayed in a table. The entries include a first entry displayed at an initial position in the table. The plurality of entries can include a plurality of rows and/or columns, for example. The first lock position is the initial position of the first entry, for example. The first lock position may be a first ordinal position of the table, for example. The first lock position may be a last ordinal position of the table, for example.

At block 620, locking of one or more entries in the table is facilitated. For example, a first indicator (e.g., a lock symbol) is displayed to indicate that the first entry has been assigned from a set of unlocked entries to a set of locked entries, and that the first entry is assigned to a first lock position.

At block 630, entries in the table are sorted according to one or more criteria to determine a sort order. The sort order may be a first sort order including a first sort position of the first entry that is different from the first lock position, for example. Locked entries may remain in their initial positions and/or be repositioned at or near the top of the table, above sorted entries, upon the sort. Sorting can occur based on one or more automatically and/or user-selected conditions or criteria, for example.

At block 640, locked and unlocked entries are displayed. For example, the set of unlocked entries is displayed according to the first sort order and the locked entries are displayed at their locked positions (e.g., the first entry is displayed at the first lock position). At block 650, additional locking, unlocking, and/or re-sorting of entries in the table is facilitated. Thus, the displayed entries can be reviewed, locked, unlocked, re-sorted, and/or otherwise manipulated, for example.

Figure 7:
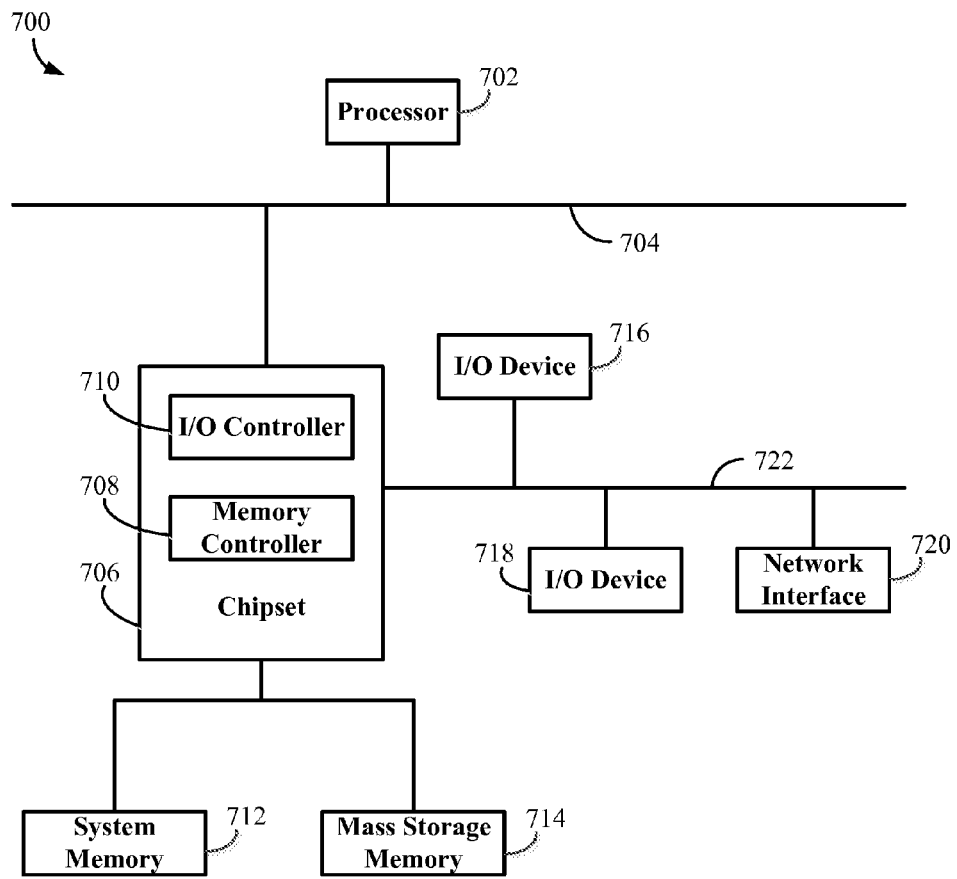
FIG. 7 illustrates a block diagram of an example processor system that can be used to implement the apparatus and methods described herein.

FIG. 7 is a block diagram of an example processor system 700 that can be used to implement the apparatus and methods described herein. As shown in FIG. 7, the processor system 700 includes a processor 702 that is coupled to an interconnection bus 704. The processor 702 may be any suitable processor, processing unit, or microprocessor. Although not shown in FIG. 7, the system 700 can be a multi-processor system and, thus, can include one or more additional processors that are identical or similar to the processor 702 and that are communicatively coupled to the interconnection bus 704.

The processor 702 of FIG. 7 is coupled to a chipset 706, which includes a memory controller 708 and an input/output (I/O) controller 710. As is well known, a chipset typically provides I/O and memory management functions as well as a plurality of general purpose and/or special purpose registers, timers, etc. that are accessible or used by one or more processors coupled to the chipset 706. The memory controller 708 performs functions that enable the processor 702 (or processors if there are multiple processors) to access a system memory 712 and a mass storage memory 714.

The system memory 712 can include any desired type of volatile and/or non-volatile memory such as, for example, static random access memory (SRAM), dynamic random access memory (DRAM), flash memory, read-only memory (ROM), etc. The mass storage memory 714 can include any desired type of mass storage device including hard disk drives, optical drives, tape storage devices, etc.

The I/O controller 710 performs functions that enable the processor 702 to communicate with peripheral input/output (I/O) devices 716 and 718 and a network interface 720 via an I/O bus 722. The I/O devices 716 and 718 can be any desired type of I/0 device such as, for example, a keyboard, a video display or monitor, a mouse, etc. The network interface 720 may be, for example, an Ethernet device, an asynchronous transfer mode (ATM) device, an 802.11 device, a DSL modem, a cable modem, a cellular modem, etc. that enables the processor system 700 to communicate with another processor system.

While the memory controller 708 and the I/O controller 710 are depicted in FIG. 7 as separate blocks within the chipset 706, the functions performed by these blocks may be integrated within a single semiconductor circuit or may be implemented using two or more separate integrated circuits.

While the invention has been described with reference to certain embodiments, it will be understood by those skilled in the art that various changes can be made and equivalents can be substituted without departing from the scope of the invention. In addition, many modifications can be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method executed by a computer processor, comprising:
    displaying, at an initial position, a first entry of a plurality of clinical data entries of a table;
    displaying a first indicator to indicate that the first entry has been assigned from a set of unlocked entries to a set of locked entries, and that the first entry is assigned to a first lock position, the first indicator visually distinguishing a locked entry from an unlocked entry and being shown while the first entry is locked;

sorting the plurality of entries based on a first criterion associated with the clinical data entries in the table to determine a first sort order including a first sort position of the first entry that is different from the first lock position;

displaying the set of unlocked entries according to the first sort order and displaying the first entry at the first lock position;

displaying a sorted position number in association with at least one entry, the sorted position number indicating a position of the associated entry with respect to the first criterion;

sorting the plurality of entries based on a second condition to determine a second sort order including a second sort position of the first entry that is different from the first lock position; and displaying the set of unlocked entries according to the second sort order and re-displaying the first entry at the first lock position.

2. The method of claim 1, wherein the plurality of entries is a plurality of rows.

3. The method of claim 1, wherein the plurality of entries is a plurality of columns.

4. The method of claim 1, wherein the first lock position is the initial position of the first entry.

5. The method of claim 1, wherein the first lock position is a first ordinal position of the table.

6. The method of claim 1, wherein the first lock position is a last ordinal position of the table.

7. The method of claim 1, wherein the initial position of the first entry is not a first ordinal position of the table.

8. The method of claim 1, further comprising displaying the first sort position of the first entry.

9. The method of claim 1, further comprising adding the first entry to the set of locked entries in response to a first user input.

10. The method of claim 1, wherein:
displaying the first indicator occurs in response to a first user input; and
displaying the set of unlocked entries according to the first sort order and displaying the first entry at the first lock position occur in response to a second user input.

11. The method of claim 1, further comprising sorting the plurality of entries to determine the initial position of the first entry.

12. The method of claim 1, further comprising displaying the second sort position of the first entry.

13. The method of claim 1, wherein:
the plurality of entries includes a second entry that is assigned to the set of locked entries and assigned to a second lock position; and
the first sort order includes a first sort position of the second entry that is different from the second lock position.

14. The method of claim 13, further comprising displaying the second entry at the second lock position.

15. The method of claim 13, further comprising displaying the second entry at the first lock position together with re-displaying the first entry at the second lock position.

16. The method of claim 1, wherein displaying the set of unlocked entries further comprises displaying the set of unlocked entries at a plurality of contiguous positions.

17. The method of claim 16, wherein the lock position is outside the plurality of contiguous positions.

18. The method of claim 1, further comprising removing the first indicator from display to indicate that the first entry is in the set of unlocked entries.

19. The method of claim 18, wherein removing the first indicator from display occurs in response to a user input.

20. A clinical information system comprising:
a memory storing instructions and data and a processor to execute the instructions, the processor to execute the instructions to:
display, at an initial position, a first entry of a plurality of entries of a table;
display a first indicator to indicate that the first entry has been assigned from a set of unlocked entries to a set of locked entries, and that the first entry is assigned to a first lock position the first indicator visually distinguishing a locked entry from an unlocked entry and being shown while the first entry is locked;
sort the plurality of entries based on a first criterion associated with the clinical data entries in the table to determine a first sort order including a first sort position of the first entry that is different from the first lock position;
display the set of unlocked entries according to the first sort order and displaying the first entry at the first lock position;
display a sorted position number in association with at least one entry, the sorted position number indicating a position of the associated entry with respect to the first criterion;
sort the plurality of entries based on a second condition to determine a second sort order including a second sort position of the first entry that is different from the first lock position; and
display the set of unlocked entries according to the second sort order and re-displaying the first entry at the first lock position.

* * * * *